United States Patent [19]
Dickinson et al.

[11] Patent Number: 6,153,282
[45] Date of Patent: *Nov. 28, 2000

[54] COMPOSITE MATERIAL AND METHOD FOR THE MANUFACTURE THEREOF

[76] Inventors: Reed S. Dickinson, 70 Bartchtts Isl. Way, Marshfield, Mass. 02050; James E. Hillis, 11 Dunster Rd., Needham, Mass. 02194

[*] Notice: This patent issued on a continued prosecution application filed under 37 CFR 1.53(d), and is subject to the twenty year patent term provisions of 35 U.S.C. 154(a)(2).

[21] Appl. No.: 08/409,974

[22] Filed: Mar. 24, 1995

[51] Int. Cl.⁷ ....................................................... B32B 3/10
[52] U.S. Cl. ............................ 428/141; 428/143; 428/147; 428/150; 428/325; 428/404; 428/407; 428/413; 428/417; 428/446
[58] Field of Search ..................................... 428/413, 141, 428/143, 147, 150, 404, 407, 417, 325, 446

[56] References Cited

U.S. PATENT DOCUMENTS

| | | | |
|---|---|---|---|
| 3,463,749 | 8/1969 | Taft | 525/532 |
| 5,096,783 | 3/1992 | Liu | 428/417 |
| 5,258,222 | 11/1993 | Crivelli | 428/323 |
| 5,316,824 | 5/1994 | George | 428/145 |

*Primary Examiner*—Leszek Kiliman
*Attorney, Agent, or Firm*—Damon J. Borrelli

[57] ABSTRACT

Disclosed is a composite material and a method for the manufacture thereof. The disclosed material includes a layer of polymeric material in substantially continuous surface-to-surface contact with a layer of cementitious material. The composite material can be used as both a planar tactile warning and as a subunit in the construction of three dimensional structures. The external surface of the polymeric material can be configured, i.e., textured or smoothed, as needed for a given application.

14 Claims, 3 Drawing Sheets

COMPOSITE MATERIAL AND METHOD FOR THE MANUFACTURE THEREOF

BACKGROUND OF THE INVENTION

1. Field of the Invention

The present invention relates to a composite material and a method for the manufacture thereof. More particularly, the invention relates to composite materials, and a method of manufacturing the same, employing polymeric and cementitious components.

2. Description of the Prior Art

The search for high strength composite materials has been a major focus in the field of material science for many years. Research in this area has focused on the use of metals, plastics, and ceramics. This research has produced new materials and processes to satisfy the changing engineering and economic needs of modern society.

Several applications exist for composite materials formed using polymeric and cementitious components. The ability to mold the polymeric component, combined with the high strength and low cost of the cementitious material, make such a composite especially useful in the construction industry. For example, wall structures formed using pre-fabricated segments of such a composite material can be assembled with both a savings of time and cost. Further, walkways, especially those wherein a tactile warning for the visually impaired is required, can be efficiently constructed and maintained. Especially advantageous is the fact that worn or damaged segments of the composite can easily be replaced in a timely and cost efficient manner.

To date, unfortunately, the use of polymer and cementitious materials to form a composite material has met with only limited success. Indeed, available materials frequently fail when exposed to changing climatic conditions. For example, it has been observed that exposure to temperature variations frequently cause polymeric and cementitious materials to shear apart due to their differing coefficients of thermal expansion. In addition, the material used to bond the fully hardened layers of polymer and cement together frequently fails. This latter limitation results in gaps between the layers of material that upon exposure to contaminants, such as water, expand and eventually result in substantially total separation of the layers.

A need has arisen for an improved polymeric/cementitious composite material and a method for its manufacture.

SUMMARY OF THE INVENTION

It is an object of the present invention to provide a high strength composite material that overcomes the foregoing limitations.

It is yet another object of the invention to provide a composite material including polymeric and cementitious layers that is resistant to weathering effects resulting from exposure to climatic changes.

It is a further object of the invention to provide a composite material having either a smooth or a textured surface resistant to wear as a result of repeated contact.

It is yet a further object of the invention to provide a composite material that can be used as a tactile warning material.

It is a yet another object of the invention to provide a method for the manufacture of a composite material.

The composite material of the present invention is characterized by a first layer that is integral with a second layer. The first layer is generally formed of a polymeric material. Typically, the polymeric material used in connection with the invention is an epoxy resin. The second layer provides a supportive backing for the first layer. The second layer is normally formed of a cementitious material.

The epoxy resin forming the first layer preferably has a high degree of mechanical strength upon polymerization. Such a characteristic is required so that the material of the invention can withstand harsh climatic exposure, chemicals, and/or repeated contact without significant wear. When used as a tactile warning material, the external surface of the polymeric layer has a series of raised bumps. These bumps provide direction and warning to visually handicapped persons as dictated by the Americans With Disabilities Act passed by the United States Congress.

The cementitious material forming the second layer preferably is a mixture of water, course and fine aggregates, cement, and a reinforcing material. The concentrations of these components can be altered as necessary for a given application in which the material of the invention is employed. The reinforcing material generally is a synthetic resin, fibre mesh, or steel reinforcing rod.

The material of the invention can be configured for use both in isolation or the construction of three dimensional structures. In either application, individual segments of the composite material of the invention are produced and positioned on a common backing material. The backing material can be virtually any substrate. Typical backing materials include prepared ground surfaces and support means such as beams, girders, or walls.

When used in isolation, the material of the invention is typically configured as a block segment. The block segments can be designed to provide a tactile warning in areas of pedestrian traffic. In this configuration, the block segments are sized and shaped so as to be removably and replaceably positionable on, for example, a prepared ground or paved surface. Typically, the block segments are positioned in a parallel array that provides a demarcation of the area of pedestrian traffic requiring caution.

In an alternative application, the segments of the material of the invention can be combined in a single piece or affixed together. This larger composite structure is then connected to a support means. Positioning of several segments of the material of the invention in this manner permits the formation of, for example, wall or flooring structures. When used in this configuration, the external polymeric surface of the present material typically is smooth.

The invention also contemplates a method for the production of a composite material. To commence the method of the invention, a form having a pre-selected configuration is prepared. Typically, a form having a series of indentation means is used if it is desired that the external polymeric surface of the composite material have a textured configuration. Next, a release agent is applied, typically sprayed, onto the exposed surfaces of the form. Once these steps are completed, an epoxy resin is prepared and then poured into the form. The epoxy resin typically includes a uniform mixture of resin material and hardening material. In addition, as required for a given application, a coloring agent can also be added to produce a polymeric material having a pre-selected hue. The resin is then allowed to stand in the form until such time as it achieves a partially plastic state.

As the epoxy hardens, a cementitious mixture is prepared. When the resin is sufficiently plastic, the cementitious mixture is poured into the form. Typically, immediately before the cementitious mixture is introduced into the form a coating of fresh epoxy resin is applied to the partially plastisized epoxy resin layer. When this intermediate step is employed, pouring of the cementitious material follows immediately thereafter. Pouring of the cementitious material is performed with care so that the thickness of the resin remains substantially uniform.

The composite material including epoxy resin and cementitious material is allowed to stand until such time as it achieves a substantially hardened state. In the final step of the method of the invention, the composite material is removed from the form and employed as may be desired.

Other general and specific objects of the invention will in part be obvious and will in part appear hereinafter.

The invention accordingly comprises the method and apparatus embodying steps, features of construction, combinations of elements, and arrangements of parts adapted to effect such steps, as exemplified in the following detailed disclosure, the scope of the invention is indicated in the claims.

BRIEF DESCRIPTION OF THE DRAWINGS

For a fuller understanding of the nature and objects of the invention, reference should be made to the following detailed description and the accompanying drawings, in which.

DESCRIPTION OF PREFERRED EMBODIMENTS

The invention features a composite material and a method for the manufacture thereof. The composite material of the invention includes a polymeric layer and a cementitious layer in substantially continuous surface-to-surface contact. The invention produces a textured high-strength composite material suitable for a variety of construction applications. For example, the composite material can be used as a tactile warning system in areas of pedestrian traffic or in connection with the construction of wall or floor structures.

Figure 1:
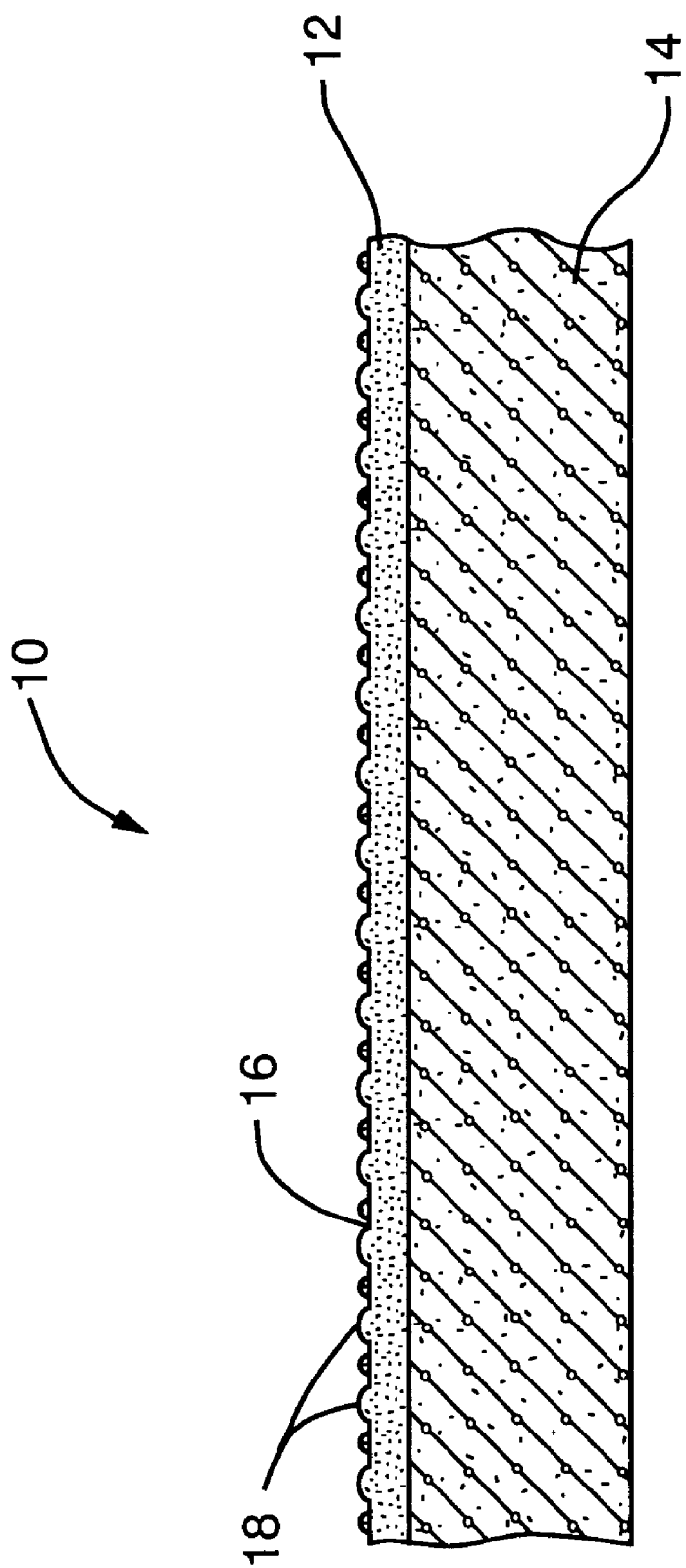
FIG. 1 is a side view of a segment of the composite material of the invention.
Figure 2:
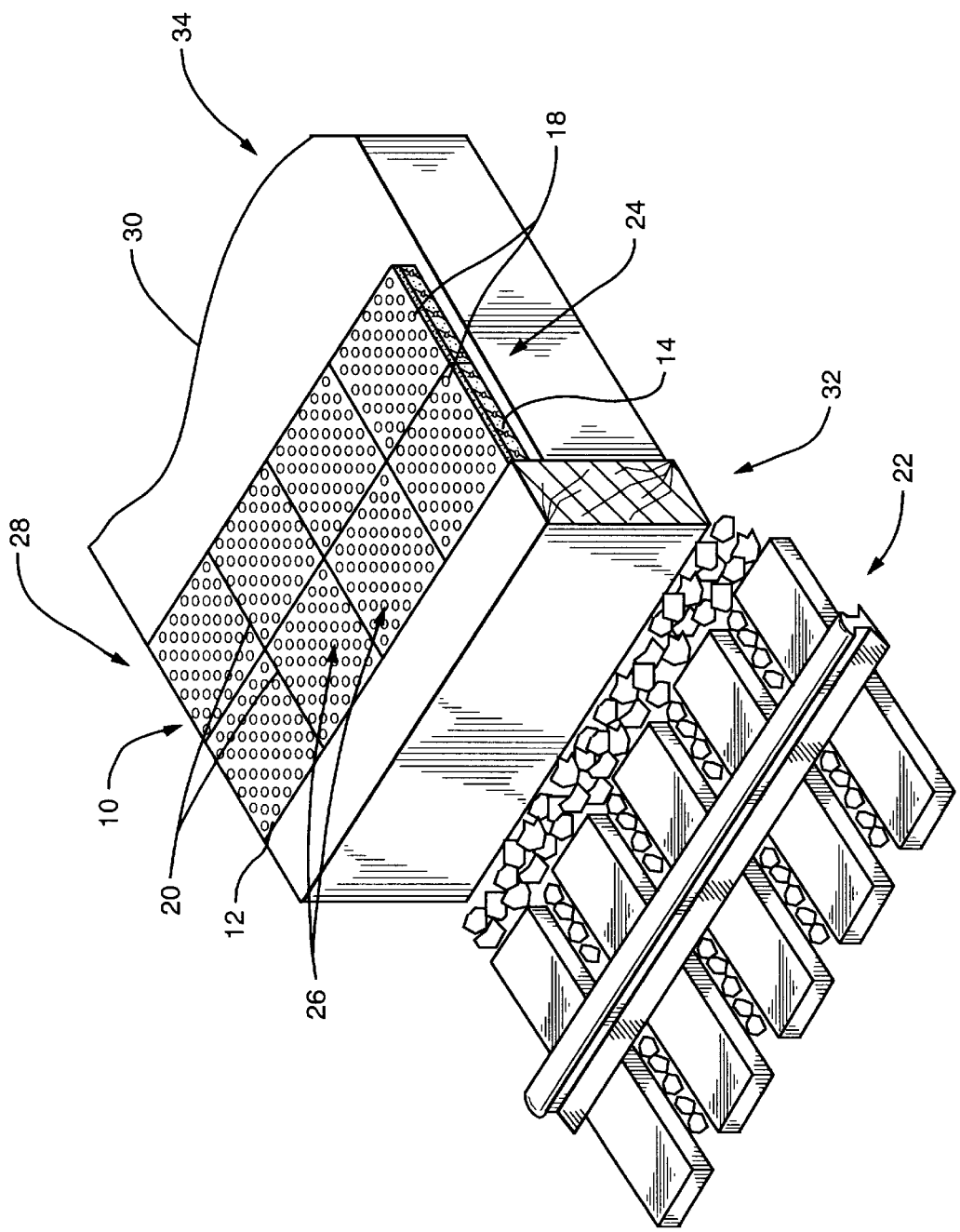
FIG. 2 is a perspective view of a series of segments of the material of the invention configured, and positioned for use, as a tactile warning material; and, FIG. 3 is a perspective view of a series of segments of the material of the invention configured, and positioned, for use in the construction of a wall structure.
Figure 3:
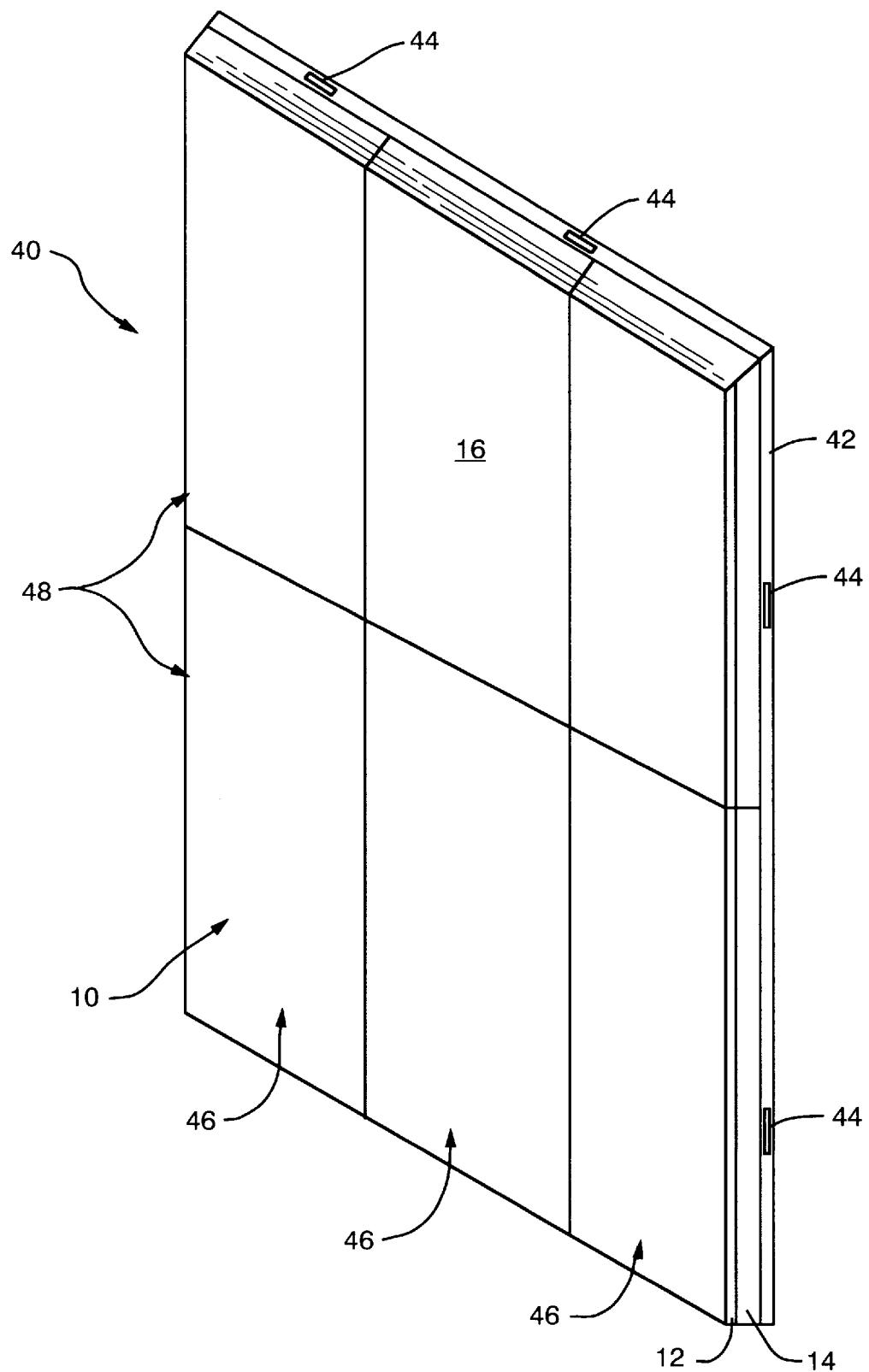

Referring to FIGS. 1 through 3 wherein like reference numerals refer to like parts, there is illustrated a composite material 10. The composite material 10 is characterized by a first layer 12 and a second layer 14. The first layer 12 is integral with the second layer 14. In the presently preferred embodiment of the invention as depicted in the FIGURES, the first layer 12 and second layer 14 are in substantially continuous surface-to-surface contact. As discussed in greater detail below, the first layer 12 is generally formed of a polymeric material. The second layer 14 is preferably formed of a cementitious material.

The polymeric material forming the first layer 12 is typically an epoxy resin. Preferably, the resin has a high degree of mechanical strength upon polymerization so that the first layer 12 can withstand repeated contact without significant wear. In addition, the resin typically is resistant to climatic, ultraviolet, and temperature variations. Although in the presently preferred embodiment of the invention the epoxy resin is a two-part resin, those skilled-in-the-art will appreciate that virtually any resin having the characteristics discussed herein can be utilized.

Those skilled-in-the-art will also appreciate that the resin forming the first layer 12 can be prepared so as to have virtually any hue. Typically, an inert material is added during the mixing process in order to achieve the desired coloring. For example, when the composite material 10 is used as a tactile warning, as discussed below in connection with FIG. 2, the color of the first layer 12 preferably is yellow. More particularly, the color of the first layer 12 will conform to Federal Color Number 33538 of standard 595A. This color is selected as it is the final color detectable by visually handicapped persons prior to going totally blind. This latter color has been employed in those applications wherein the composite material 10 is used as a wall segment in, for example, tunnels, as discussed below in connection with FIG. 3.

The epoxy resin of the first layer 12 is formed by mixing a first resin component with a second hardening component. By varying the relative concentrations of these two components the curing time, as well as some of the physical properties of the final epoxy, can be modified as desired. In the presently preferred embodiment of the invention, both the resin component and hardening component are manufactured and sold by Custom Resin Systems, Inc., of Carver, Mass. More particularly, the presently preferred resin component is sold under the tradename CRS-304AD/FR. The preferred hardening component utilized with this resin component is sold under the tradename HF-12. Other useful resin and hardening components include those sold under the tradename CRS 276 A&B. These materials are preferred as they exhibit low shrinkage during curing. Further, upon polymerization the resulting polymer has a coefficient of thermal expansion closing matching that of the cementitious material of layer 14.

The facing surface 16 of the first layer 12 can be textured as desired for a given application. For example, when the composite material 10 is used as a tactile warning material, as discussed below in connection with FIG. 2, the facing surface 16 of the first layer 12 has a series of raised bumps 18. Alternatively, when used as wall or floor material, as discussed in connection with FIG. 3, the facing surface 16 of first layer 12 is typically smooth.

The cementitious material forming the second layer 14 preferably is a mixture of water, sand, cement, and a reinforcing material. As those skilled-in-the-art can appreciate, the proportions of these components can be varied in accordance with the products being realized, their uses and expected stresses. Such determinations are within the current knowledge of those skilled-in-the-art, more particularly those skilled-in-the-art of manufactured concrete.

In anticipation of a manufacturing cycle as described in greater detail below, a mixture of the cementitious material forming the second layer 14 having the following composition is typically prepared:

Portland Cement 610 lbs.
Sand 1060 lbs.
¾ Inch Coarse Aggregate 2069 lbs.
Water 25 gallons These components typically are admixed with auxiliary agents, for example, surfactants, selected from among those products generally used in the techniques of cement manufacturing. In addition, in the preferred embodiment of the invention, a synthetic fibre mesh material, typically in an amount equal to about 1.5 lbs., is added to enhance the mechanical strength of the second layer 14. In an alterative embodiment of the invention, the synthetic fibre mesh material may be replaced by steel reinforcing rods, wire mesh, or a combination of the synthetic fibre mesh, steel reinforcing rods, and wire mesh.

The invention also contemplates a method for the production of the above-described composite material 10. To commence the method of the invention, a form having a pre-selected configuration is prepared. In one embodiment of the method, a form having a series of indentation means is used. Such a form is utilized when it is desired that the facing surface 16 of the composite material 10 is to have a textured configuration. Next, a release agent is applied, typically sprayed, onto the exposed surfaces of the form. A silicone based release agent is preferred for used in connection with the method of the invention. Those skilled-in-the-art will appreciate, however, that virtually any release agent commonly used in connection with polymeric resins can be utilized.

In the next series of steps, the epoxy resin described above is prepared. More particularly, in the preferred embodiment of the invention a hardener having the tradename HF-12 as described above is mixed with a resin having the designation CRS-304AD/FR. Both of these materials are manufactured and sold by Custom Resin Systems, Inc. of Carver, Mass. Concurrently, the desired colorant is added to the resin/hardener mixture. This final blend is then thoroughly mixed and poured into the form. Typically, the resin is spread throughout the base of the form so that a uniform thickness for this eventual first layer 12 is produced. In the preferred embodiment of the invention the first layer 12, after curing, has a thickness between about 0.1 inches and 1.0 inch. The final blend of the resin is then allowed to stand in the form until such time as it achieves a partially plastic state.

As the epoxy resin hardens, a cementitious mixture is prepared. The cementitious mixture preferably has a composition as described above. In the presently preferred embodiment of the invention, a synthetic fibre mesh component is added to the mixture to enhance the overall mechanical strength of the cementitious mixture. When, however, the composite material 10 is to be used as wall or floor structure the fibre mesh is typically replaced with steel reinforcement rods.

When the resin has achieved a partially plastic state, the cementitious mixture is poured into the form. Typically, immediately before the cementitious mixture is introduced into the form a coating of fresh epoxy resin is applied to the partially plasticized epoxy resin layer. This fresh coating can be identical to that material used to form the final blend discussed above. Alternatively, a different epoxy resin, having the tradename designation CRS-276, can be used. As noted above, this material is available from Custom Resin Systems, Inc., of Carver, Mass. By coating the surface of the plastisized resin in this manner the surface is re-activated. Re-activation of the resin produces substantially continuous surface-to-surface contact between the first layer 12 and second layer 14.

Once the epoxy resin is plastisized and prepared, the cementitious material is immediately poured into the mold. Pouring of the cementitious material is performed with care so that the thickness of the resin remains substantially uniform. Sufficient cementitious material is added to the form so that upon curing the second layer 14 has a thickness between amount 1.0 and 6.0 inches.

The composite material 10, including epoxy resin forming the first layer 12 and cementitious material forming second layer 14, is allowed to stand until such time as it achieves a substantially hardened state. In the final step of the method of the invention, the composite material 10 is removed from the form. The composite material 10 can then be employed as may be desired.

Referring now to FIG. 2, there is shown the composite material 10 configured for use as a tactile warning material 20. More particularly, this embodiment of the composite material 10 provides a tactile warning as to the distance and proximity to a depressed railroad track bed 22. Although the tactile warning material 20 is shown in connection with a railroad platform, those skilled-in-the-art will appreciate that the material 20 can also be used in connection with, for example, pedestrian crossings, wheelchair ramps, and road curbings. In all of these applications, the tactile warning material 20 has a textured facing surface 16. The exact type of texturing is as described in detail below.

The facing surface 16 of the tactile warning material 20 includes a series of raised bumps 18. In the preferred embodiment of the invention as shown in FIG. 2, each of the bumps 18 has a height of about 0.5 inches. The diameter of the bumps 18 is between about 0.75 inches and about 1.0 inch. Although the bumps 18 preferably have a hemispheric or convex configuration, other shapes such as truncated domes can be used. Although not shown in the FIGURE, the bumps 18 can have alternative configurations as desired, for example, bars, triangles, or arrows. The exact type and configuration for the bumps 18 is dictated by the purpose for which the tactile warning material 20 is employed.

In the embodiment of the invention as shown in FIG. 2, the arrangement of the bumps 18 is in the form of a dot pattern. The bumps 18 are equally spaced with no particular direction indicted. The bumps 18 can be arranged in order to provide more detailed directional information.

As shown in FIG. 2, the composite material 10 preferably is positioned on a prepared ground surface 24. Each segment 26 of the composite material 10 is positioned with its facing surface 16 exposed. The tactile warning material 20 is preferably placed in close proximity to the area requiring caution. Accordingly, in the FIGURE the tactile warning material 20 is positioned close to a railroad bed 22. To produce an effective demarcation, the segments 26 of the composite material 10 are placed in a parallel array 28. The length and depth of the array 28 is dictated by the size, in this case, of a railroad platform 30. Preferably several courses of the segments 26 are positioned near the boundary 32 of the railroad platform 30. Once positioned, the joints between individual segments 26 are filled, caulked, or grouted as necessary. The central, that is, safe, area 34 of the railroad platform 30 can be asphalt, concrete, or other commonly used materials. In operation, as a person approaches the boundary 32 of the platform 30 they come into contact with the segments 26 and, thus, the bumps 18 of the tactile warning material 20. The feeling of the bumps 18 underfoot provides a warning that the individual is approaching, in this case, the boundary 32 of the platform 30.

Once positioned, should any of the segments 26 become damaged they can be replaced without disturbing adjacently positioned segments 26. More particularly, to begin a replacement procedure the damaged segment 26 is cut out of the array 28. The ground surface 24 where the damaged segment 26 was located is then leveled and prepared for a replacement segment 26. To complete the procedure, a replacement segment 26 having dimensions identical to the segment 26 that was damaged is placed into the hole where the formerly damaged segment 26 was located. This procedure avoids replacement of the entire array 28 in order to correct localized damage.

Referring now to FIG. 3, there is shown the composite material 10 configured for use as a prefabricated wall unit 40. More particularly, this embodiment of the composite material 10 is configured to be positioned on, for example, beams and girders, or walls in order to form an internal or external floor, ceiling, or wall for a building, tunnel, or other structure. In this embodiment of the composite material 10, the facing surface 16 may be smooth or otherwise patterned. Further, if desired a striping detail (not shown) can be inlaid or molded into the facing surface 16.

As shown in FIG. 3, the composite material 10 preferably is positioned on a backing material 42 including connecting means 44. The connecting means 44 are configured to permit connection of the wall unit 40 to an available support structure, i.e., beam, girder, floor, or wall. Given the wide variety of configurations utilized in modern architecture, the wall unit 40 can be configured as either a planar or curved structure. Indeed, by varying the size of the individual segments 46 of the wall unit 40 a complex, compound segmented or curved structure can easily be created.

In the embodiment of the invention as shown in FIG. 3, each segment 46 of the composite material 10 is positioned with its facing surface 16 exposed. The base of the second cementitious layer 14 is bonded to the backing material 42. To produce the wall unit 40, the segments 46 of the composite material 10 are placed in a parallel array 48. The length and height of the array 48 is dictated by the size of the final wall structure to be created. Preferably, several courses of the segments 46 are bonded to the backing material 42. Once positioned, the individual segments 46 are grouped as necessary. Once complete, the wall unit 40 can be lifted into position and secured to a support structure using the connection means 44.

Once positioned, should any part of the wall unit 40 become damaged it can be replaced without disturbing adjacently positioned wall units 40 or segments 46 thereof. More particularly, to begin a replacement procedure the damaged wall until 40 is removed from the support structure. If necessary, structural repairs are then made to the support structure. The support structure is then prepared to receive a new wall unit 40. To complete the procedure, a wall unit 40 having dimensions identical to the wall unit 40 that was damaged is placed into the hole where the formerly damaged wall unit 40 was located. This procedure avoids repair to the entire wall structure in order to correct localized damaged.

It will thus be seen that the invention efficiently attains the objects set forth above, among those made apparent from the preceding description.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by letters patent is:

1. A multilaminate composite material, said material consisting essentially of:
a first layer integrally bonded to a second layer, said first layer and said second layer being separate and distinct layers, said first layer being formed of a first selected material, said second layer being formed of a second selected material, said first material being different from said second material, said first layer being a substantially homogenous mixture of said first material, said second layer being a substantially homogenous mixture of said second material;
said first layer having a first external surface and a second external surface, said first layer being formed of a dimensionally stable polymeric material;
said second layer having a first external surface and a second external surface said first external surface of said second layer being directly bonded to said second external surface of said first layer such that said first external surface of said second layer is in substantially continuous surface-to-surface contact with said second external surface of said first layer, said second layer being a supportive backing material for said first layer, said second layer being formed of a cementitious material.

2. The composite material of claim 1 wherein said polymeric material forming said first layer is an epoxy resin.

3. The composite material of claim 1 wherein said cementitious material forming said second layer is a mixture of water, aggregate, cement, and a reinforcing material.

4. The composite material of claim 1 wherein said first layer has a series of raised bumps thereon, said bumps providing direction and warning to visually handicapped persons.

5. The composite material of claim 1 being configured as a paving block, said paving block being sized and shaped so as to be removably and replaceably positionable in areas of pedestrian traffic.

6. A composite construction material comprising a series of polygonal multilaminate segments connected to a common backing material, said polygonal multilaminate segments consisting essentially of:
a composite multilaminate material having a first material integrally and directly bonded to, and in substantially surface-to-surface contact with, a second material, said first material forming a first layer and said second material forming a second layer, said first layer and said second layer being separate and distinct layers, said first material being different from said second material, said first layer being a substantially homogenous mixture of said first material, said second layer being a substantially homogenous mixture of said second material;
said first material being a dimensionally stable polymeric material having a first external surface and a second external surface; and
said second material having a first external surface and a second external surface, said first external surface of said second material being directly bonded to said second external surface of said first material, said second external surface of said first material being in substantially continuous surface-to-surface contact with said first external surface of said second material, said second material being a cementitious material, said cementitious material forming a supportive backing for said first material, said second material connected to said common backing material.

7. The composite material of claim 6 wherein said material forming said first layer of said segments is an epoxy resin.

8. The composite material of claim 6 wherein said cementitious material forming said second layer of said segments is a mixture of water, sand, cement, and a reinforcing material.

9. The composite material of claim 6 wherein said first external surface of said first material of said segments has a series of substantially identical raised bumps extending therefrom, said bumps providing an indication of said areas of pedestrian traffic requiring caution.

10. The composite material of claim 9 wherein said segments are sized and shaped to be removably and replaceably connectable to a base surface located in said areas of pedestrian traffic.

11. The composite material of claim 10 wherein said segments are adjacently positioned in rows so as to form a parallel array, said array being configured to provide a demarcation of said area of pedestrian traffic requiring caution.

12. The composite material of claim 6 wherein said first external surface of said first material of said segments has a substantially smooth configuration.

13. The composite material of claim 12 wherein said segments are sized and shaped to be removably and replaceably connectable to a support means so as to form a wall structure.

14. The composite material of claim 10 wherein said segments are adjacently positioned in rows so as to form a parallel array of said segments, said array of said segments being configured so as to form a self-supporting wall structure, said wall structure having a first exposed surface and a second exposed surface, said first external surface of said first material forming at least one of either of said first and second exposed surfaces of said wall structure.

\* \* \* \* \*